(12) United States Patent
Gunnalan et al.

(10) Patent No.: US 11,240,277 B2
(45) Date of Patent: Feb. 1, 2022

(54) MULTIPOINT CONFERENCING SESSIONS MULTIPLEXED THROUGH PORT

(71) Applicant: Microsoft Technology Licensing, LLC, Redmond, WA (US)

(72) Inventors: Rajesh Gunnalan, Sammamish, WA (US); Mihhail Konovalov, Kirkland, WA (US); Tin Qian, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/948,276

(22) Filed: Sep. 10, 2020

(65) Prior Publication Data

US 2020/0412774 A1    Dec. 31, 2020

Related U.S. Application Data

(63) Continuation of application No. 16/430,798, filed on Jun. 4, 2019, now Pat. No. 10,785,271.

(51) Int. Cl.
*G06F 15/16* (2006.01)
*H04L 29/06* (2006.01)

(52) U.S. Cl.
CPC .................. *H04L 65/403* (2013.01)

(58) Field of Classification Search
CPC ..................................... H04L 65/403
USPC ........................................ 709/204
See application file for complete search history.

(56) References Cited

U.S. PATENT DOCUMENTS

| | | | |
|---|---|---|---|
| 6,459,774 B1 | 10/2002 | Ball et al. | |
| 6,631,179 B1 | 10/2003 | Sifuentes | |
| 7,116,763 B2 | 10/2006 | Sifuentes | |
| 7,532,878 B2 | 5/2009 | Hagebarth | |
| 7,620,955 B1* | 11/2009 | Nelson | G06F 9/45533 719/312 |

(Continued)

OTHER PUBLICATIONS

Keranen, et al., "Interactive Connectivity Establishment (ICE): A Protocol for Network Address Translator (NAT) Traversal", In Internet Engineering Task Force (IETF), Request for Comments: 8445, Jul. 20, 2018, 101 Pages.

(Continued)

*Primary Examiner* — Moustafa M Meky
(74) *Attorney, Agent, or Firm* — Alleman Hall Creasman & Tuttle LLP

(57) ABSTRACT

A conferencing computing device, including memory storing one or more dispatch data structures. The conferencing computing device may further include a processor configured to receive a plurality of input packets at a shared port from a plurality of sender computing devices. Based on input packet data and the one or more dispatch data structures, the processor may add each input packet to an input queue bound to the shared port. The processor may transmit the input packets to a plurality of application program instances associated with the input queues. The processor may generate a plurality of output packets at the application program instances. The processor may add each output packet to an output queue associated with the application program instance at which that output packet was generated. The processor may, through the shared port, transmit the output packets to a plurality of recipient computing devices.

20 Claims, 10 Drawing Sheets

(56) References Cited

U.S. PATENT DOCUMENTS

| | | | | |
|---|---|---|---|---|
| 7,813,352 | B2* | 10/2010 | Riddle | H04L 63/1458 |
| | | | | 370/395.42 |
| 8,310,927 | B1* | 11/2012 | Cohen | H04L 12/413 |
| | | | | 370/231 |
| 9,667,686 | B2* | 5/2017 | Ramalho | H04L 12/1818 |
| 9,893,994 | B2* | 2/2018 | Ee | H04L 45/00 |
| 10,505,747 | B2* | 12/2019 | Pope | H04L 12/1804 |
| 2005/0185783 | A1 | 8/2005 | Hagebarth | |
| 2006/0256803 | A1* | 11/2006 | Nakata | H04L 1/1887 |
| | | | | 370/412 |
| 2008/0239956 | A1* | 10/2008 | Okholm | H04L 47/2441 |
| | | | | 370/232 |
| 2008/0285445 | A1* | 11/2008 | Riddle | H04L 43/0882 |
| | | | | 370/230.1 |
| 2014/0095615 | A1 | 4/2014 | Ito | |
| 2015/0172355 | A1* | 6/2015 | Ramalho | H04L 65/80 |
| | | | | 370/260 |
| 2016/0072957 | A1 | 3/2016 | Gordon | |
| 2017/0214725 | A1 | 7/2017 | Kudo et al. | |
| 2018/0234471 | A1 | 8/2018 | Qian et al. | |
| 2020/0036646 | A1* | 1/2020 | Mathew | H04L 45/16 |

OTHER PUBLICATIONS

"International Search Report & Written Opinion issued in PCT Application No. PCT/US20/030014", dated Aug. 35,2020, 11 Pages.
"Notice of Allowance Issued in U.S. Appl. No. 16/948,277", dated Oct. 4, 2021, 8 Pages.

* cited by examiner

MULTIPOINT CONFERENCING SESSIONS MULTIPLEXED THROUGH PORT

CROSS REFERENCE TO RELATED APPLICATIONS

This application is a continuation of U.S. patent application Ser. No. 16/430,798, filed Jun. 4, 2019, the entirety of which is hereby incorporated herein by reference for all purposes.

BACKGROUND

Using online conferencing application programs, two or more users may communicate remotely via modalities such as voice and video. These online conferencing application programs typically make use of a conferencing server that receives communications from each of the client devices in a session and transmits those communications to the other client devices.

SUMMARY

According to one aspect of the present disclosure, a conferencing computing device is provided, including memory storing one or more dispatch data structures. The conferencing computing device may further include a processor configured to receive a plurality of input packets at a shared port from a plurality of sender computing devices, each input packet having respective input packet data. Based on the input packet data and the one or more dispatch data structures, for each input packet of the plurality of input packets, the processor may be further configured to add that input packet to an input queue bound to the shared port. The processor may be further configured to transmit the plurality of input packets to a plurality of application program instances that are respectively associated with the plurality of input queues. The plurality of application program instances may be executed concurrently. The processor may be further configured to generate a plurality of output packets at the plurality of application program instances. For each output packet of the plurality of output packets, the processor may be further configured to add that output packet to an output queue associated with the application program instance at which that output packet was generated. The processor may be further configured to, through the shared port, transmit the plurality of output packets from the respective output queues of the plurality of application program instances to a plurality of recipient computing devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Existing methods of establishing multipoint conferencing sessions typically use an Interactive Connectivity Establishment (ICE) protocol, such as Session Traversal Utilities for Network Address Translation (STUN) or Traversal Using Relays around Network Address Translation (TURN). These protocols may allow two or more client computing devices, each of which may apply a network address translator (NAT) to its outgoing packets, to receive packets from each other via a server despite obfuscation of their Internet Protocol (IP) addresses.

However, existing ICE protocols have a number of drawbacks. First, when TURN is used, establishing a connection between the client and the server with which TURN is implemented includes multiple rounds of back-and-forth communication between the client and server, which may slow or prevent the connection from being established when packet loss occurs. Second, existing ICE methods may require the server to open a large number of ports when used for multiple concurrent multipoint conferencing sessions. Opening a large number of ports may increase the complexity of firewall setup and other security risk management tasks for server administrators. Third, existing ICE protocols may result in dropped calls when client devices switch to different communication channels. For example, dropped calls may occur due to roaming.

Figure 1:
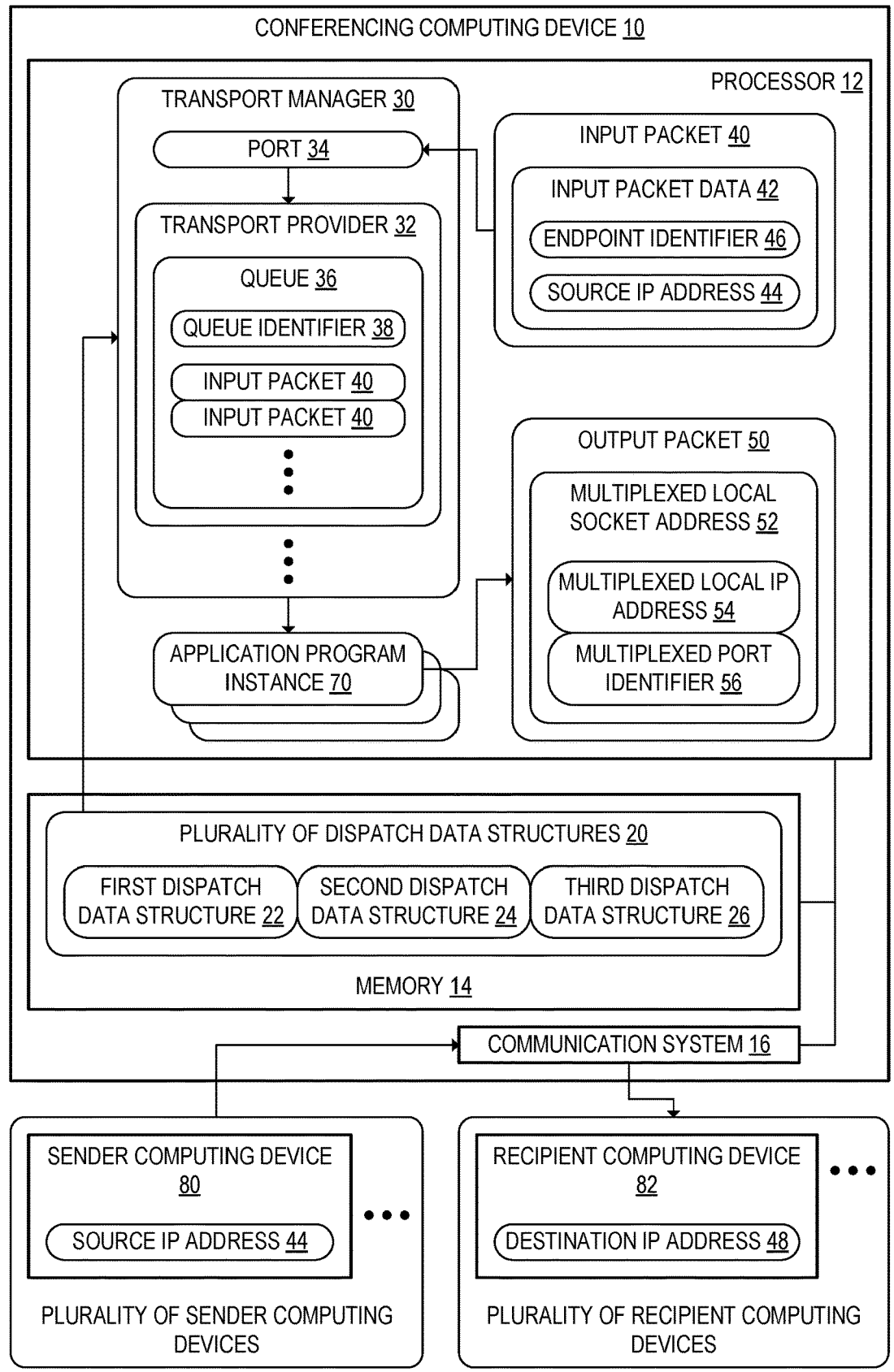
FIG. 1 schematically depicts a conferencing computing device, according to one embodiment of the present disclosure.

In order to address the above problems, a conferencing computing device 10 is provided, as schematically shown in the example of FIG. 1. The conferencing computing device 10 may be a server computing device, such as a multipoint control unit. The conferencing computing device 10 shown in FIG. 1 includes a processor 12 that is operatively coupled to memory 14. The conferencing computing device as shown in the example of FIG. 1 further includes a communication system 16, which may include one or more hardware components via which the conferencing computing device 10 may communicate with other computing devices. In some embodiments, the functions performed by the processor 12 and memory 14 of the conferencing computing device 10 may be distributed across a plurality of physical computing devices that are communicatively coupled by their respective communication systems 16.

Via the communication system 16, the processor 12 may be configured to receive a plurality of input packets 40 from a plurality of sender computing devices 80. For example, the sender computing device 80 and a recipient computing device 82 may be included in a video call, and the input packet 40 may include video data configured to be sent from the sender computing device 80 to the recipient computing device 82. Each of the sender computing devices 80 and the recipient computing devices 82 may be a client computing device.

The plurality of input packets 40 may be received at a port 34, which may be included in a transport manager 30. The port 34 may be a physical port or a logical port. In some embodiments, the transport manager 30 may have a plurality of ports 34. In such embodiments, each port 34 of the plurality of ports 34 may each be configured to receive input packets 40 with a predetermined communication modality type, such as text, audio, or video. Each port 34 may be a port through a firewall of the conferencing computing device 10.

In some embodiments, each input packet 40 may be a Universal Datagram Protocol (UDP) packet. In other embodiments, the plurality of input packets 40 may include one or more Transmission Control Protocol (TCP) packets. Each input packet 40 may have respective input packet data 42, which may include a source IP address 44 of the sender computing device 80 of the plurality of sender computing devices 80 from which the input packet 40 is received. Additionally or alternatively, the input packet data 42 of each input packet 40 may include an endpoint identifier 46 of the sender computing device 80. An endpoint identifier 46 may be included in the input packet 40 when a multiplexed TURN (MTURN) protocol is used. The source IP address 44 or the endpoint identifier 46 may, in some embodiments, be included in a header of the input packet 40.

The transport manager 30 may include a plurality of transport providers 32 bound to the port 34. Each transport provider 32 may include a queue 36 configured to hold one or more input packets 40. Each queue 36 may be one of a plurality of queues 36 respectively included in a corresponding one of the plurality of transport providers 32. In some embodiments, each queue 36 may be a lock-free queue. For each input packet 40 of the plurality of input packets 40, the processor 12 may be further configured to add that input packet 40 to a queue 36 of the plurality of queues 36. The plurality of input packets 40 may be added to the queues 36 based at least in part on the respective input packet data 42 of the plurality of input packets 40, as discussed in further detail below.

The memory 14 of the conferencing computing device 10 may store one or more dispatch data structures 20 that may be used when sorting the plurality of input packets 40 into the queues 36 of the transport providers 32. Each queue 36 of the plurality of queues 36 may have a respective queue identifier 38. Each dispatch data structure 20 may map at least a portion of the input packet data 42 to a queue identifier 38. Thus, each input packet 40 may be added to a queue 36 based on the input packet data 42 of that input packet 40 and the one or more dispatch data structures 20. In some embodiments, the one or more dispatch data structures 20 may include one or more dispatch tables.

Figure 2A:
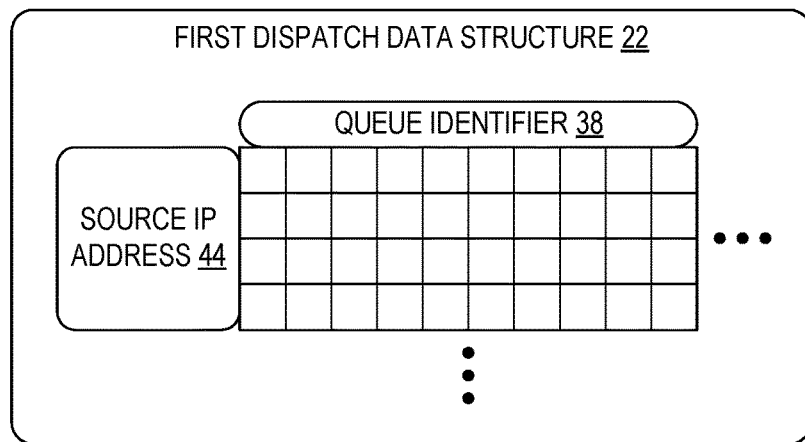
FIGS. 2A-2C show example dispatch data structures, according to the embodiment of FIG. 1.
Figure 2B:
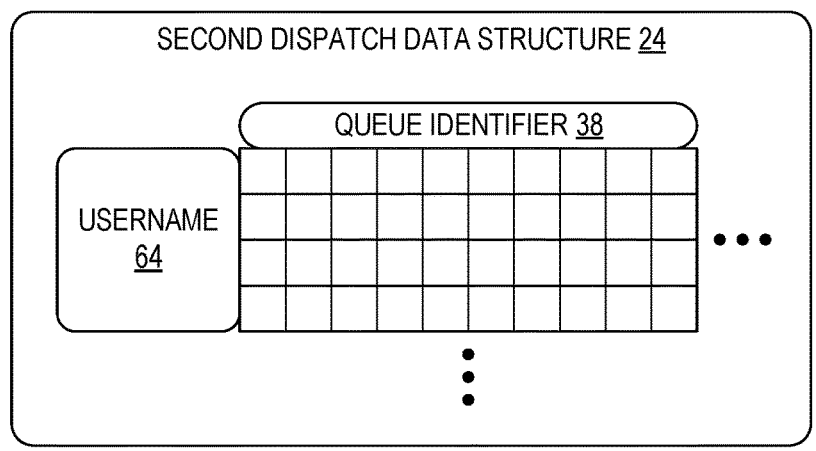
Figure 2C:
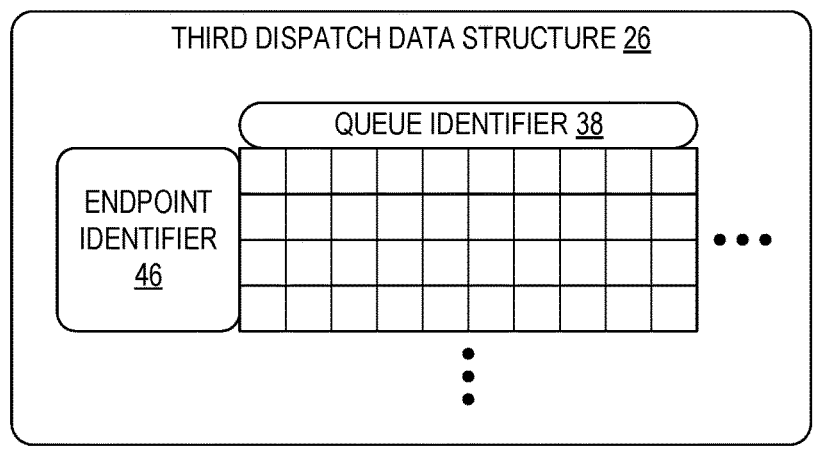

Three example dispatch data structures 20 are shown in FIGS. 2A-C. In the examples of FIGS. 2A-C, the dispatch data structures 20 are dispatch tables. FIG. 2A shows a first dispatch data structure 22 of the one or more dispatch data structures 20 that maps the respective source IP addresses 44 of the plurality of input packets 40 to the plurality of queue identifiers 38. FIG. 2B shows a second dispatch data structure 24 of the one or more dispatch data structures 20 that maps a respective plurality of usernames 64 of a plurality of binding requests included in the plurality of input packets 40 to the plurality of queue identifiers 38. The plurality of binding requests may be a plurality of STUN binding requests, as discussed in further detail below with reference to FIGS. 4A-B. FIG. 2C shows a third dispatch data structure 26 of the one or more dispatch data structures 20 that maps the respective endpoint identifiers 46 of the plurality of input packets 40 to the plurality of queue identifiers 38.

Returning to FIG. 1, after the plurality of input packets 40 have been added to the plurality of queues 36, the processor 12 may be further configured to transmit the plurality of input packets 40 to a plurality of application program instances 70. The plurality of application program instances 70 may be run on the processor 12. The plurality of application program instances 70 may be respectively associated with the plurality of queues 36 and may instantiate a respective plurality of concurrent multipoint conferencing sessions. The input packets 40 in each queue 36 may be transmitted to the application program instance 70 associated with that queue 36 in an order in which the input packets 40 were added to the queue 36.

In some embodiments, the plurality of application program instances 70 may be instances of an audioconferencing or videoconferencing application program. In such embodiments, each concurrent multipoint conferencing session of the plurality of concurrent multipoint conferencing sessions may be an audioconferencing session or a videoconferencing session. For example, the plurality of concurrent multipoint conferencing sessions may use the H.323 standard for audio-visual communication sessions.

Figure 3:
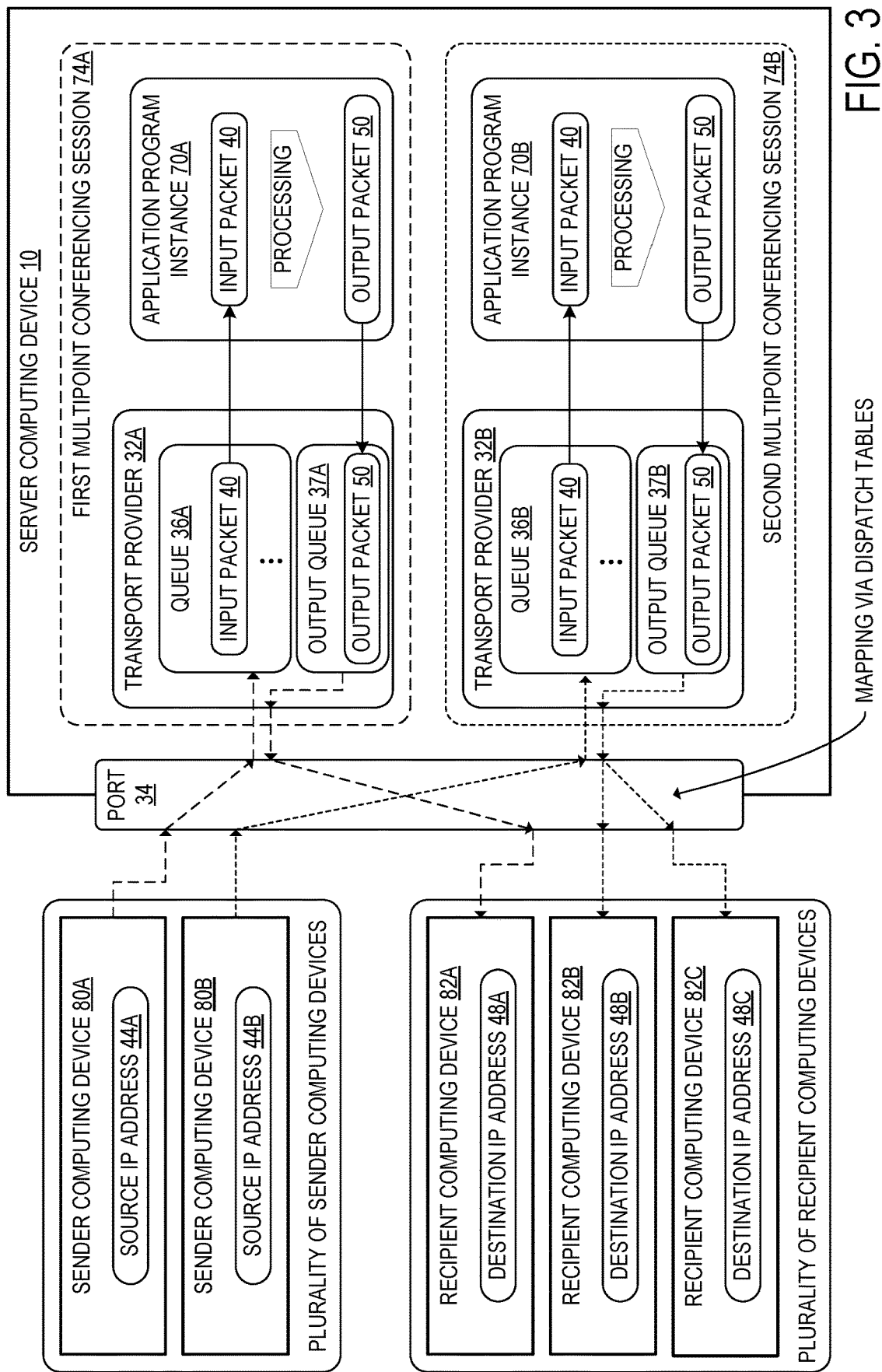
FIG. 3 shows the conferencing computing device of FIG. 1 when a first multipoint conferencing session and a second multipoint conferencing session are concurrently instantiated, according to one example.

FIG. 3 shows an example of a first multipoint conferencing session 74A and a second multipoint conferencing session 74B that are concurrently instantiated by the conferencing computing device 10 of FIG. 1. In the first multipoint conferencing session 74A shown in FIG. 3, a first sender computing device 80A with a first source IP address 44A communicates a plurality of input packets 40 to the conferencing computing device 10, which are received at the port 34. The first multipoint conferencing session 74A is handled at a first transport provider 32A including a first queue 36A. The processor 12 transmits the input packets 40 from the first queue 36 to a first application program instance 70A. Concurrently with the first multipoint conferencing session 74A, the conferencing computing device 10 also instantiates a second multipoint conferencing session 74B in which a plurality of input packets 40 are received at the port 34 from a second sender computing device 80B with a second source IP address 44B. A second transport provider 32B bound to the port 34 adds the plurality of input packets 40 received from the second sender computing device 80B to a second queue 36B, from which the processor 12 further transmits the plurality of input packets 40 included in the second queue 36B to a second application program instance 70B.

Returning to FIG. 1, the plurality of application program instances 70 may generate a plurality of output packets 50. Each output packet 50 may be generated based at least in part on one or more input packets 40 received at the application program instance 70. The data included in the plurality of output packets 50 may depend upon the particular application program used. For example, when the application program is an online game application program, the processor 12 may perform computations such as running a physics simulation. After the plurality of output packets 50 have been generated, the processor 12 may be further configured to transmit the plurality of output packets 50 from the plurality of application program instances 70 to a plurality of recipient computing devices 82. Each recipient computing device 82 may have a destination IP address 48 to which the processor 12 may send one or more of the plurality of output packets 50.

In some embodiments, when the plurality of output packets 50 are transmitted to the plurality of recipient computing devices 82, each output packet 50 may be transmitted via the transport provider 32 from which the application program instance 70 received the input packet 40 based on which the output packet 50 was generated. Each output packet 50 generated at an application program instance 70 may, in such embodiments, be transmitted from the application program instance 70 to the transport provider 32 via an output queue of the application program instance 70. From the transport provider 32, each output packet 50 may be transmitted to the recipient computing device 82 via the port 34.

In the example of FIG. 3, the input packets 40 are sent from each transport provider 32A, 32B to the corresponding application program instance 70A, 70B, where they are processed according to program logic and resultant output packets 50 are generated and sent back from the application program instances 70A, 70B, to output queues 37A, 37B of each of the transport providers 32A, 32B, respectively. From the output queues, the output packets 50 are sent from the transport provider output queues 37A, 37B to appropriate recipient computing devices 82A, 82B, 82C associated with the first and second multipoint conferencing sessions 74A, 74B. The plurality of output packets 50 generated at the first application program instance 70A are transmitted to a first recipient computing device 82A having a first destination IP address 48A. The plurality of output packets 50 generated at the second application program instance 70B are transmitted to a second recipient computing device 82B having a second destination IP address 48B and a third recipient computing device 82C having a third destination IP address 48C. Thus, the conferencing computing device 10 in the example of FIG. 3 maintains two separate multipoint conferencing sessions that each include different sets of sender and recipient computing devices. In the first multipoint conferencing session 74A, inputs are received from the sender computing device 80A and outputs are sent to the recipient computing device 82A. In the second multipoint conferencing session 74B, inputs are received from the second sender computing device 80B and outputs are sent to the second and third recipient computing devices 82B, 82C. While the first multipoint conferencing session 74A and the second multipoint conferencing session 74B use different transport providers 32, queues 36, and application program instances 70, the same port 34 is used for both the first multipoint conferencing session 74A and the second multipoint conferencing session 74B.

Returning to the example of FIG. 1, each output packet 50 may have a multiplexed local socket address 52 of the port 34. The multiplexed local socket address 52 may include a multiplexed local IP address 54 and a multiplexed port identifier 56. The multiplexed local socket address 52 may be included in output packet data of the output packet 50. By multiplexing the plurality of multipoint conferencing sessions across the port 34, the processor 12 may reduce the number of separate ports 34 that are opened when managing multiple multipoint conferencing sessions. Since a smaller number of ports 34 may be used, security of the conferencing computing device 10 may be easier to maintain.

Figure 4A:
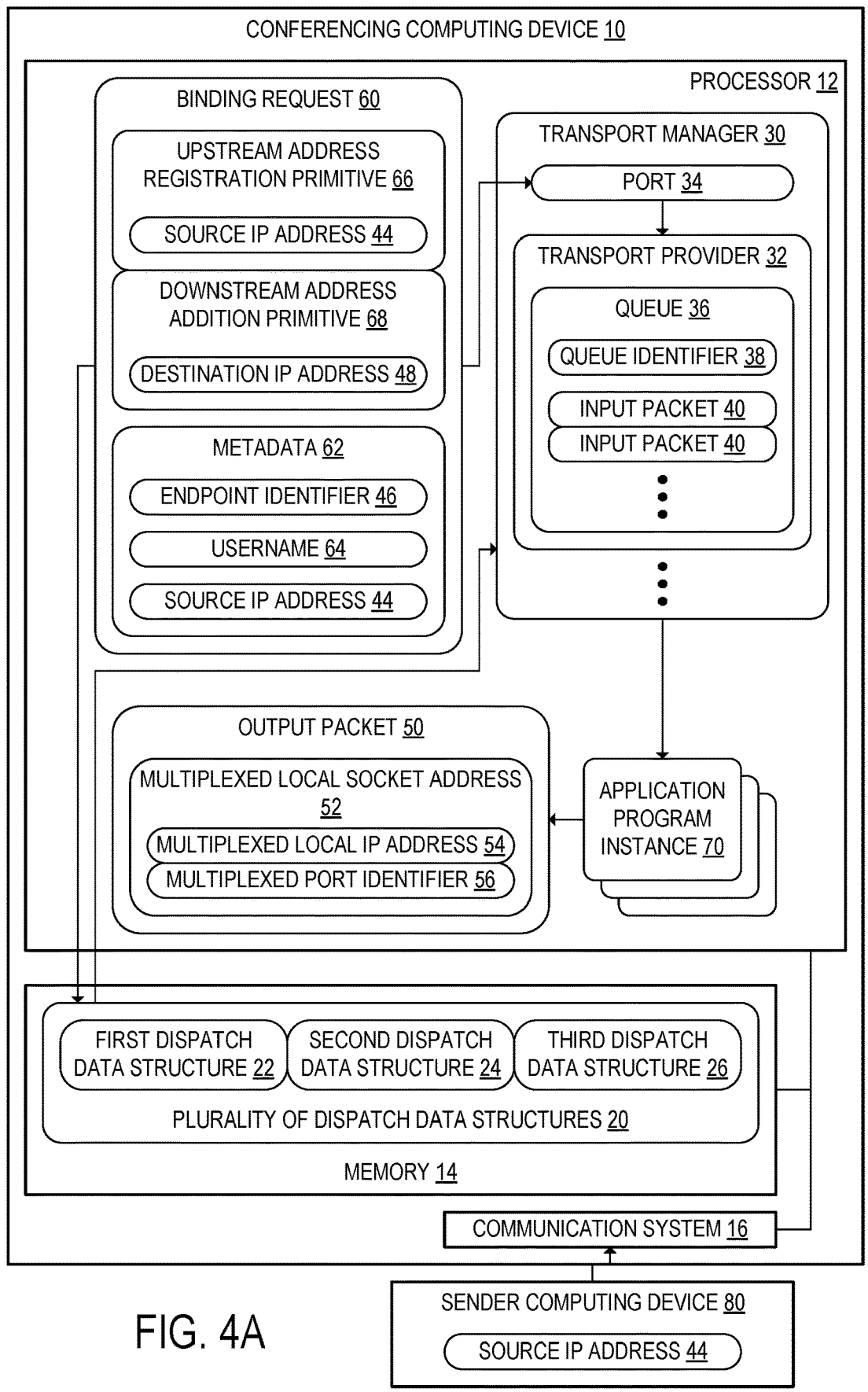
FIG. 4A shows the conferencing computing device of FIG. 1 when a binding request is received, according to one example.

Turning now to FIG. 4A, the plurality of input packets 40 may include a binding request 60 including a new source IP address 44. In some embodiments, the binding request 60 may be a Session Traversal Utilities for NAT (STUN) binding request. In other embodiments, some other protocol may be used. The binding request 60 may include metadata 62, which may include the new source IP address 44. The metadata 62 may further include an endpoint identifier 46 and/or a username 64 of the sender computing device 80. The username 64 may be a STUN username in embodiments in which STUN is used. In response to receiving the binding request 60, the processor 12 may be further configured to add the new source IP address 44 to the first dispatch data structure 22. When a source IP address 44 is added to the first dispatch data structure 22, the processor 12 may associate the source IP address 44 with an existing queue identifier 38 or create a new queue identifier 38 with which the new source IP address 44 is associated. Additionally or alternatively, when the binding request 60 includes a username 64, the username 64 may be added to the second dispatch data structure 24. When the binding request 60 includes an endpoint identifier 46 of the sender computing device 80, the endpoint identifier 46 may be added to the third dispatch data structure 26. Similarly to when the source IP address is added to the first dispatch data structure 22, a username 64 or an endpoint identifier 46 that is added to the second dispatch data structure 24 or the third dispatch data structure 26 respectively may be associated with an existing queue identifier 38 or a new queue identifier 38.

In some embodiments, the binding request 60 may further include an upstream address registration primitive 66 or a downstream address addition primitive 68. The upstream address registration primitive 66 may include the source IP address 44 and may be an instruction to add the new source IP address 44 to the first dispatch data structure 22. The downstream address addition primitive 68 may be an instruction to add the destination IP address 48 of one or more recipient computing devices 82 to a multipoint conferencing session so that the conferencing computing device 10 may send one or more output packets 50 to the recipient computing device 82. The downstream address addition primitive 68 may include the respective destination IP addresses 48 of the one or more recipient computing devices 82. When the binding request 60 includes both an upstream address registration primitive 66 and a downstream address addition primitive 68, the sender computing device 80 may establish connection with the recipient computing device 82 by sending the binding request 60 to the conferencing computing device 10 without having to send or receive other packets. Thus, a number of packets sent between the sender computing device and the conferencing computing device to establish a multipoint conferencing session may be reduced relative to existing ICE protocols. In addition, one-packet connection establishment may allow dropped connections to be reestablished more quickly, resulting in fewer interruptions in communication between sender computing devices 80 and recipient computing devices 82.

Figure 4B:
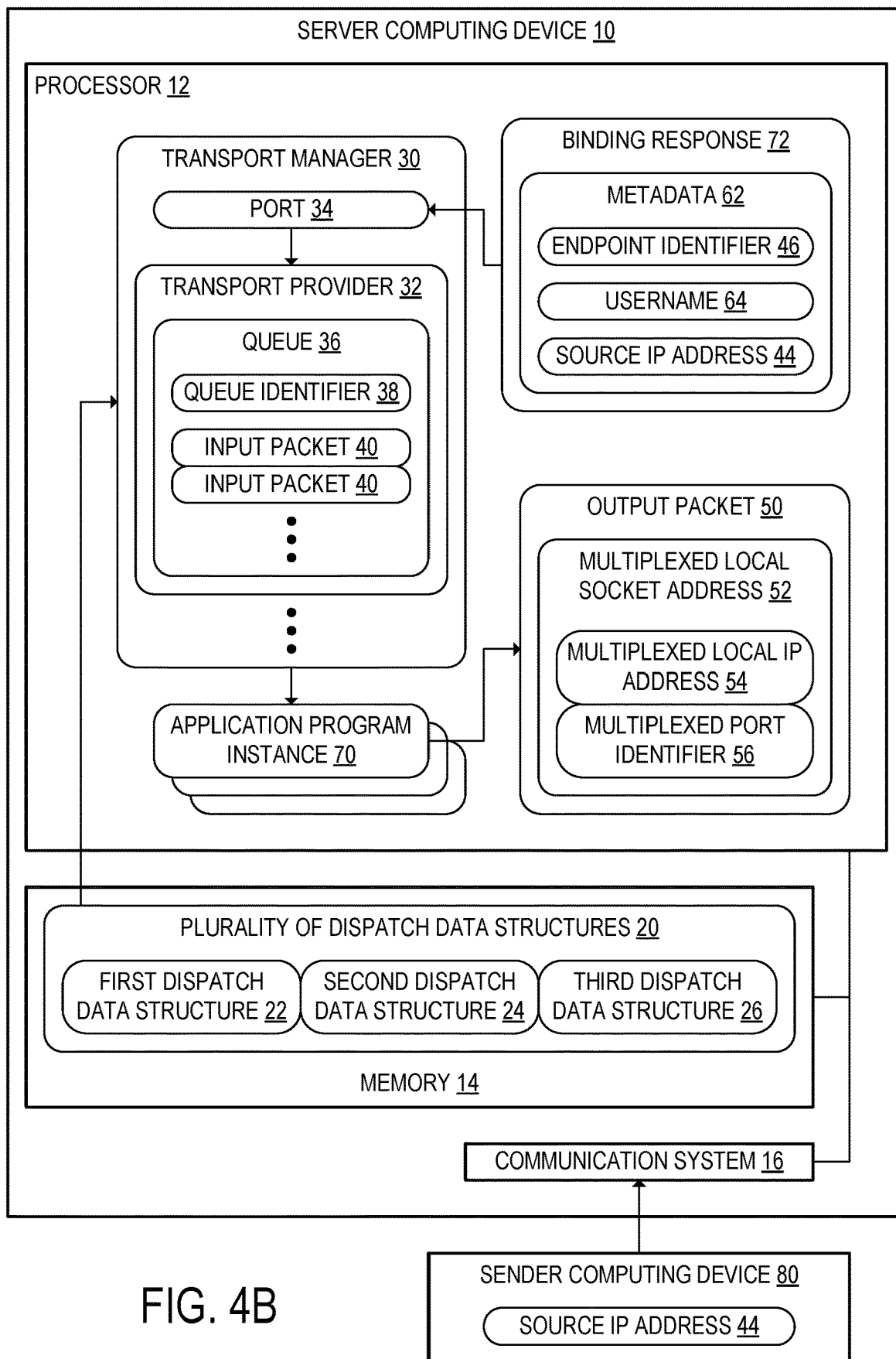
FIG. 4B shows the conferencing computing device of FIG. 1 when a Session Traversal Utilities for Network Address Translation (STUN) binding response is received, according to one example.

Turning now to FIG. 4B, the processor 12 may be further configured to receive a binding response 72 included in the plurality of input packets 40. In embodiments in which STUN is used, the binding response 72 may be a STUN binding response. Similarly to the binding request 60, the binding response 72 may include metadata 62. The processor 12 may be further configured to determine that the source IP address 44 of the sender computing device 80 from which the binding response 72 is received is not included in the second dispatch data structure 24. The second dispatch data structure 24 may be queried, for example, when the source IP address 44 of the sender computing device 80 is hidden by NAT and is not already stored at the conferencing computing device 10. Additionally or alternatively, the processor 12 may be further configured to determine that the queue identifier 38 of the queue 36 associated with the transport provider 32 at which the binding response 72 is received is not included in the second dispatch data structure 24. Either of these conditions may indicate that the binding response 72 has been received from a sender computing device 80 with which binding was not previously established. In response to making one of these determinations, the processor 12 may be further configured to discard the binding response 72 without establishing a multipoint conferencing session with the sender computing device 80 from which the binding response 72 was received.

When the processor 12 modifies the one or more dispatch data structures 20, the processor 12 may be configured to write to the one or more dispatch data structures 20 using a round robin, round robin with weighting based on server characteristics, least connections, least traffic, least latency, requested URL-specific routing logic, or random approach, or some combination thereof. Other approaches for writing to the one or more dispatch data structures 20 may additionally or alternatively be used. In some embodiments, the processor 12 may be configured to execute a machine learning algorithm that tracks communication session quality for the mappings included in the one or more dispatch data structures 20. In such embodiments, the machine learning algorithm may modify the dispatch data structure writing approach when the machine learning algorithm detects that a communication session is below a communication session quality threshold, in order to select parameters of the dispatch data structures 20 that result in higher communication session quality.

Figure 5A:
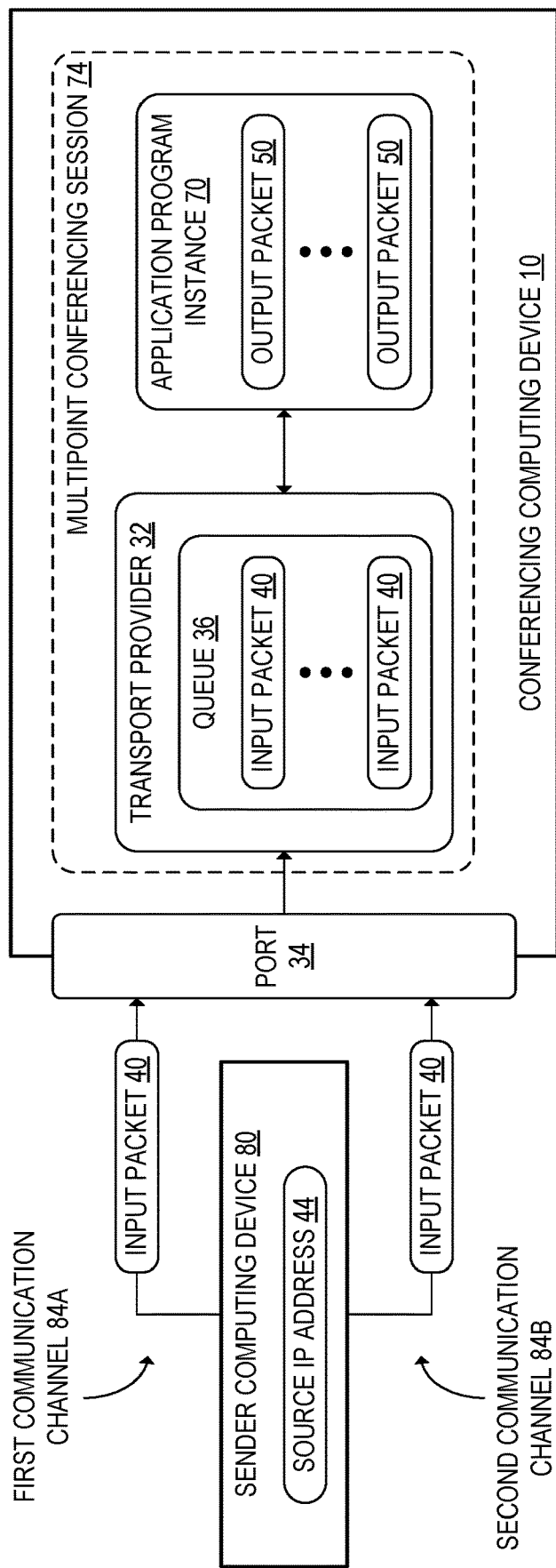
FIG. 5A shows a first communication channel and a second communication channel between a sender computing device and a conferencing computing device, according to the embodiment of FIG. 1.

In some embodiments, the conferencing computing device 10 may receive a plurality of copies of at least one input packet 40 via a respective plurality of communication channels from a sender computing device 80 of the plurality of sender computing devices 80. FIG. 5A schematically shows an example of multipath communication between a sender computing device 80 and the conferencing computing device 10 of FIG. 1. In the example of FIG. 5A, two copies of an input packet 40 are respectively sent from the sender computing device 80 to the conferencing computing device 10 over a first communication channel 84A and a second communication channel 84B. The communication channels may for example be different Internet access channels, a mobile wireless connection over 4G and a wired Ethernet connection, or two different wireless access points to the Internet, etc. The port 34 receives the copies of the input packet 40 sent over both the first communication channel 84A and the second communication channel 84B. If connection via the first communication channel 84A or the second communication channel 84B is lost, the conferencing computing device 10 may not have to switch to using a different port 34 to maintain communication with the sender computing device 80. Thus, multiplexing inputs at the port 34 may allow for greater connection reliability.

Figure 5B:
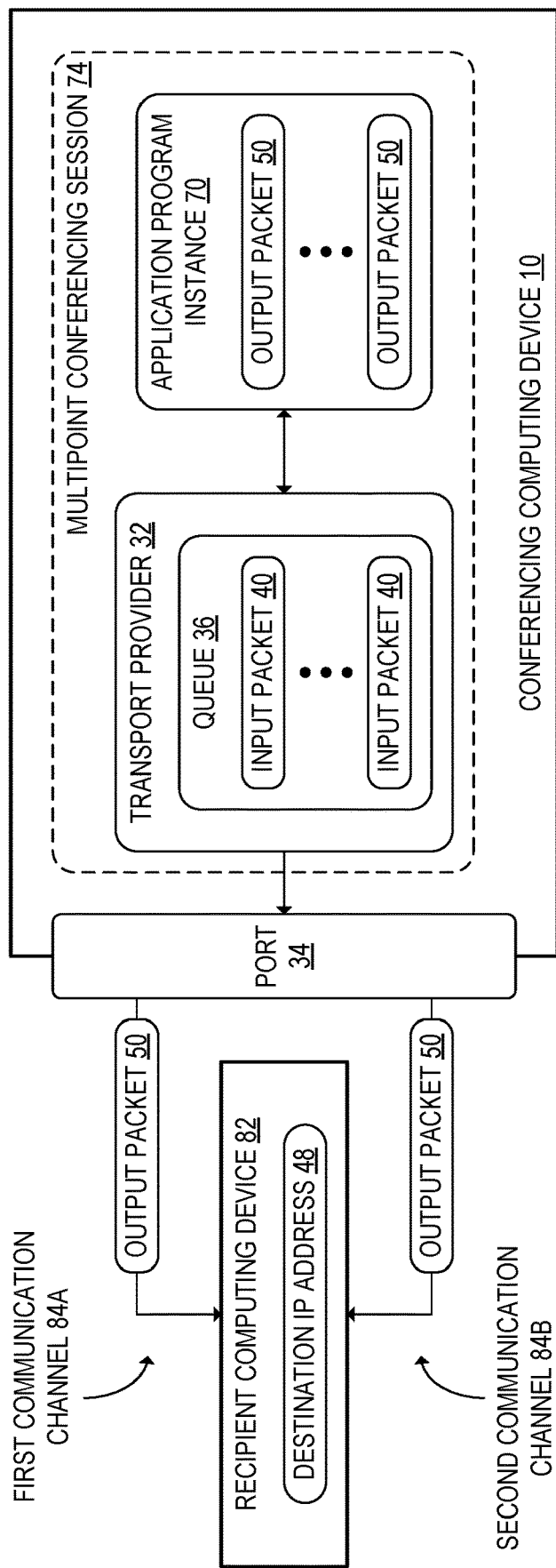
FIG. 5B shows a first communication channel and a second communication channel between a conferencing computing device and a recipient computing device, according to the embodiment of FIG. 1.

In some embodiments, as shown in FIG. 5B, multipath communication over a multiplexed port 34 may also be used for connections between the conferencing computing device 10 and one or more recipient computing devices 82. In such embodiments, a plurality of copies of an output packet 50 may be sent to the recipient computing device 82 over a respective plurality of communication channels. In the example of FIG. 5B, two copies of an output packet 50 are sent to the recipient computing device 82 over a first communication channel 84A and a second communication channel 84B respectively.

Figure 6:
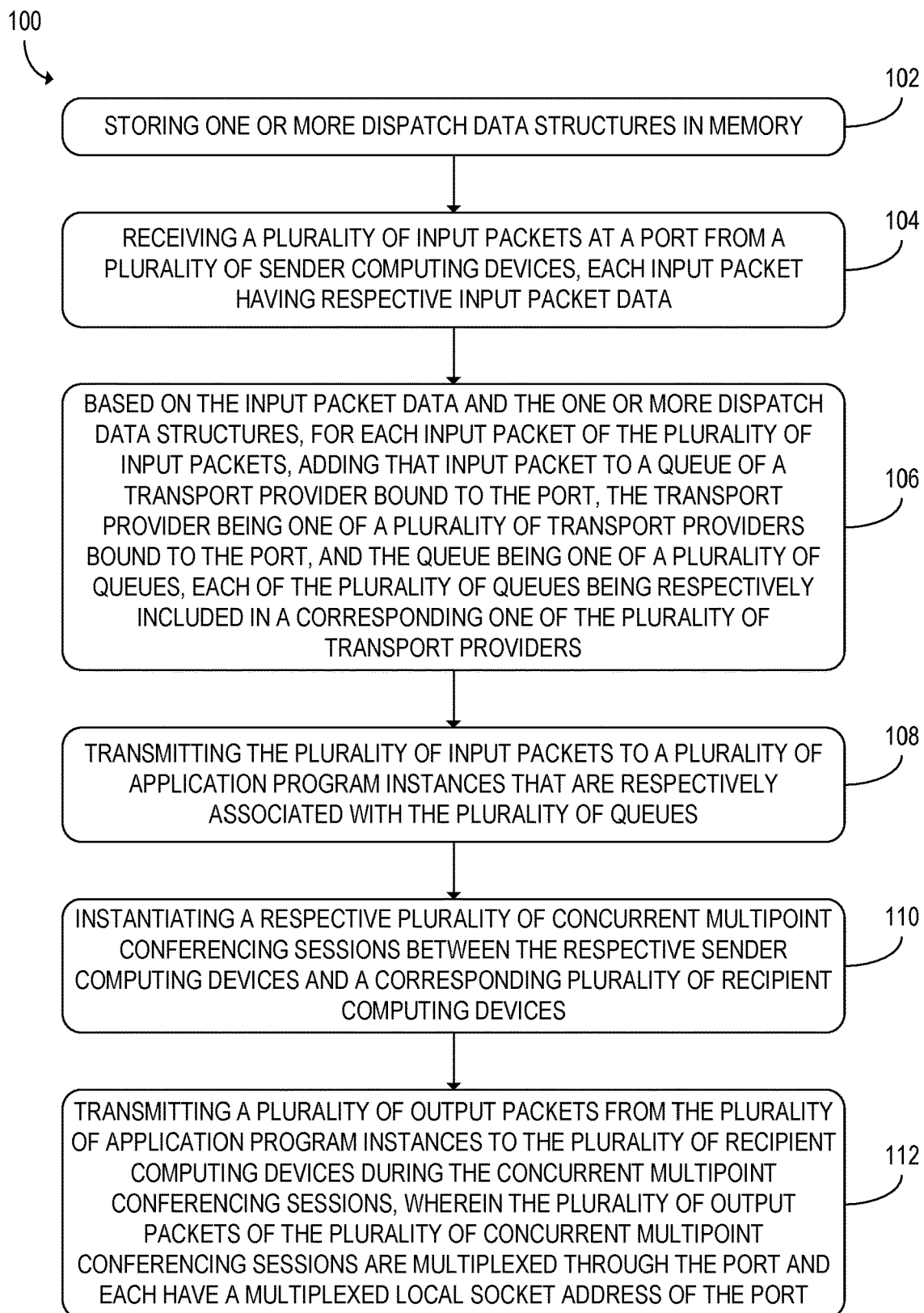
FIG. 6 shows a flowchart of a method that may be used with a conferencing computing device, according to the embodiment of FIG. 1.

FIG. 6 shows a flowchart of an example method 100 that may be used with a conferencing computing device. The method 100 may be used with the conferencing computing device 10 of FIG. 1, or alternatively with some other conferencing computing device. At step 102, the method 100 may include storing one or more dispatch data structures in memory.

At step 104, the method 100 may further include receiving a plurality of input packets at a port from a plurality of sender computing devices. Each input packet may have respective input packet data, which may, for example, include a source IP address, a STUN username, or an endpoint identifier of the sender computing device. In some embodiments, each input packet may be a UDP packet. In other embodiments, the plurality of input packets may include one or more TCP packets.

At step 106, the method 100 may further include, for each input packet of the plurality of input packets, adding that input packet to a queue of a plurality of queues respectively included in a plurality of transport providers bound to the port. The transport provider may be one of a plurality of transport providers bound to the port, and the queue may be one of a plurality of queues. Each of the plurality of queues may be respectively included in a corresponding one of the plurality of transport providers. The plurality of input packets may be added to the plurality of queues based on the input packet data and the one or more dispatch data structures. In some embodiments, each queue may be a lock-free queue.

Each queue may, in some embodiments, have a respective queue identifier. In such embodiments, selecting the queue to which to add an input packet may include querying the one or more dispatch data structures with at least one piece of input packet data included in the input packet to determine a queue identifier associated with that piece of input packet data in a dispatch data structure. The one or more dispatch data structures may include a first dispatch data structure that maps a respective source IP addresses of the plurality of input packets to a plurality of queue identifiers. Additionally or alternatively, the one or more dispatch data structures may include a second dispatch data structure that maps a respective plurality of usernames of a plurality of binding requests included in the plurality of input packets to a plurality of queue identifiers. The plurality of usernames may be a plurality of STUN usernames of a respective plurality of STUN binding requests. Additionally or alternatively, the one or more dispatch data structures may include a third dispatch data structure that maps the respective endpoint identifiers of a plurality of input packets to a plurality of queue identifiers.

At step 108, the method 100 may further include transmitting the plurality of input packets to a plurality of application program instances that are respectively associated with the plurality of queues. The plurality of application program instances may each generate one or more respective output packets. At step 110, the method 100 may further include instantiating a respective plurality of concurrent multipoint conferencing sessions between the respective sender computing devices and a corresponding plurality of recipient computing devices. Each of the concurrent multipoint conferencing sessions may be instantiated on an application program instance of the plurality of application program instances. In some embodiments, each concurrent multipoint conferencing session of the plurality of concurrent multipoint conferencing sessions may be an audioconferencing session or a videoconferencing session.

At step 112, the method 100 may further include transmitting a plurality of output packets from the plurality of application program instances to the plurality of recipient computing devices during the concurrent multipoint conferencing sessions. The plurality of output packets may be transmitted to respective destination IP addresses of a corresponding plurality of recipient computing devices registered with the conferencing computing device. In some embodiments, the plurality of output packets may be transmitted to the plurality of recipient computing devices via the port at which the plurality of input packets were received. The plurality of output packets may each have a multiplexed local socket address of the port. The multiplexed local socket address of the port may include a multiplexed local IP address and a multiplexed port identifier.

Figure 7A:
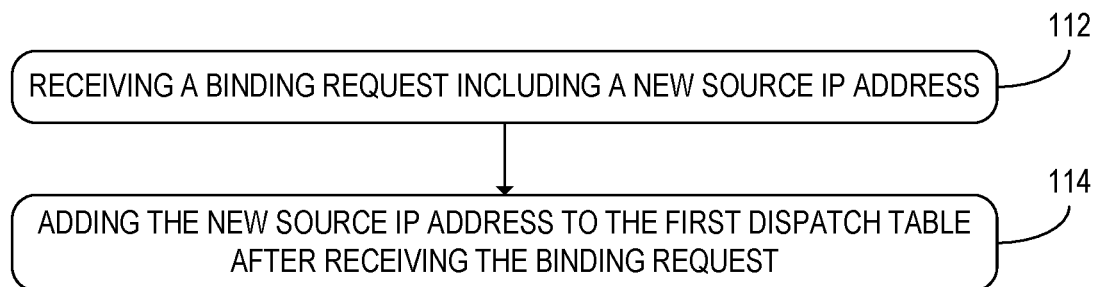
FIGS. 7A-7B show additional steps of the method of FIG. 6 that may be performed in some example embodiments.
Figure 7B:
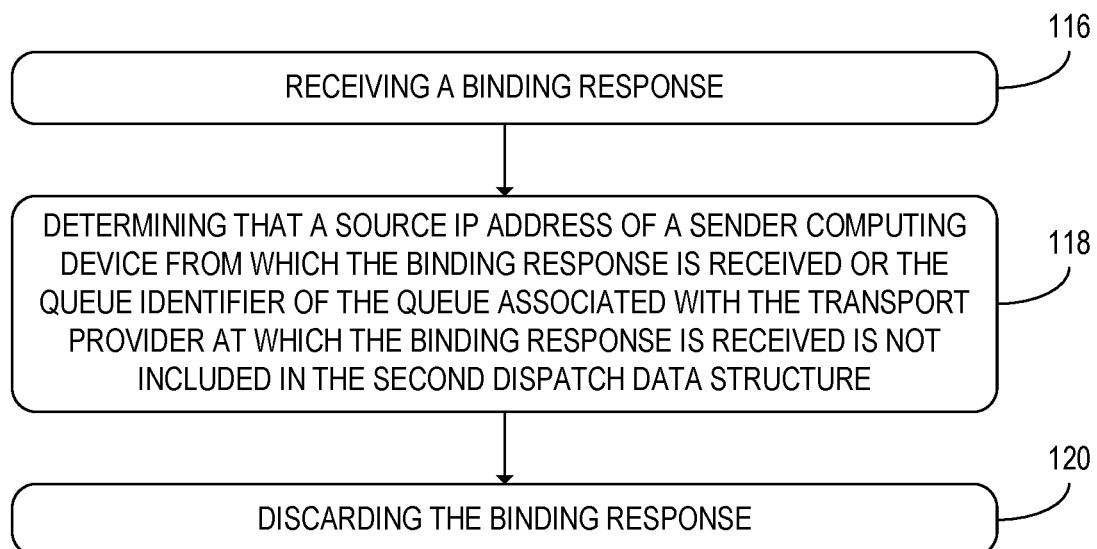

FIGS. 7A-B show additional steps of the method 100 that may be performed in some embodiments. FIG. 7A shows step 112, at which the method 100 may include receiving a binding request including a new source IP address. The binding request may be a STUN binding request. At step 114, the method 100 may further include adding the new source IP address to the first dispatch data structure in response to receiving the binding request. In some embodiments, the new source IP address is added to the first dispatch data structure when the binding request includes an upstream address registration primitive and a downstream address addition primitive. The upstream address registration primitive may include the source IP address. Additionally or alternatively, the downstream address addition primitive may include a destination IP address of a recipient computing device.

FIG. 7B shows steps of the method 100 that may be performed when the method 100 includes, at step 116, receiving a binding response. The binding response may be an input packet of the plurality of input packets, and may, in some embodiments, be a STUN binding response to a STUN binding request. At step 118, the method 100 may further include determining that a source IP address of a sender computing device from which the binding response is received or the queue identifier of the queue associated with the transport provider at which the binding response is received is not included in the second dispatch data structure. Thus, when either of these conditions occurs, the binding response may be identified as originating from an unauthenticated source. In response to this identification, the method 100 may further include, at step 120, discarding the binding response without establishing a multipoint conferencing session.

Using the devices and methods discussed above, multiple concurrent multipoint conferencing sessions may be established between groups of client computing devices such that fewer ports through a firewall of a conferencing computing device are used. Using fewer ports has the advantages of reducing the complexity and cost of running the conferencing computing device and allowing the security of the conferencing computing device to be maintained more easily. In addition, by multiplexing a plurality of communication channels between a sender computing device and the conferencing computing device over a shared port, connectivity between the sender computing device and the conferencing computing device may be maintained if a communication channel fails. Port multiplexing further allows connections between the sender computing device and the conferencing computing device to be established with a smaller number of packets and allows connectivity to be maintained when roaming of a client computing device occurs.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
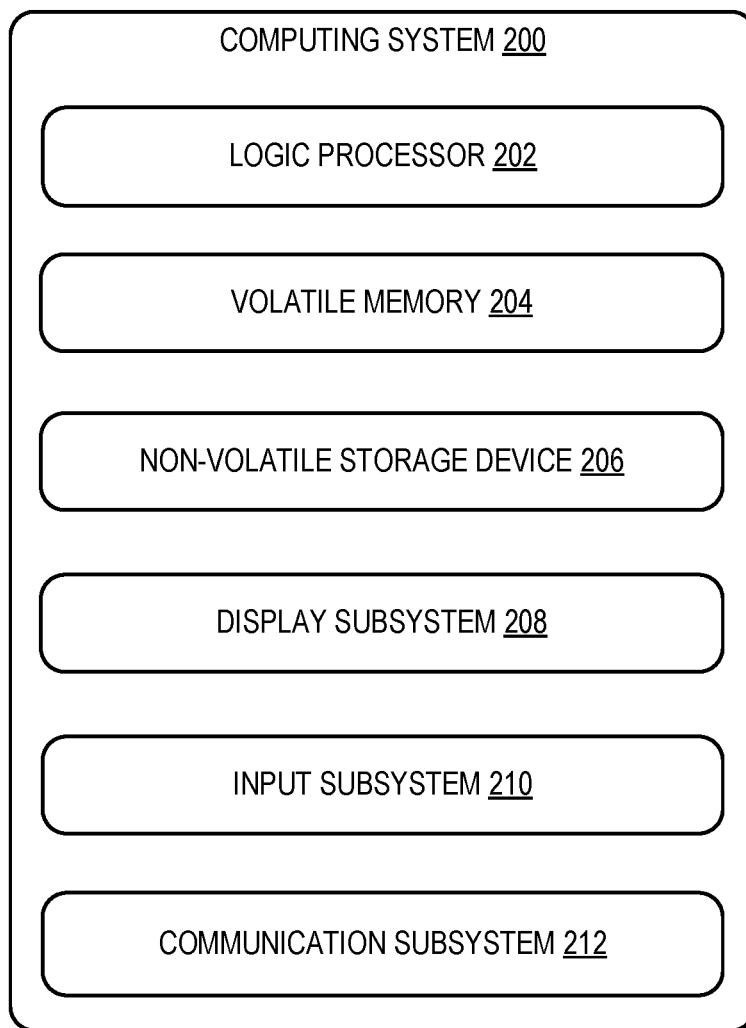
FIG. 8 shows a schematic view of an example computing environment in which the computer device of FIG. 8 may be enacted.

FIG. 8 schematically shows a non-limiting embodiment of a computing system 200 that can enact one or more of the methods and processes described above. Computing system 200 is shown in simplified form. Computing system 200 may embody the conferencing computing device 10 described above and illustrated in FIG. 1. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 8.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 200 to send and/or receive messages to and/or from other devices via a network such as the Internet.

According to one aspect of the present disclosure, a conferencing computing device is provided, including memory storing one or more dispatch data structures. The conferencing computing device may further include a processor configured to receive a plurality of input packets at a port from a plurality of sender computing devices. Each input packet may have respective input packet data. Based on the input packet data and the one or more dispatch data structures, for each input packet of the plurality of input packets, the processor may be further configured to add that input packet to a queue of a transport provider bound to the port. The transport provider may be one of a plurality of transport providers bound to the port. The queue being one of a plurality of queues, each of the plurality of queues being respectively included in a corresponding one of the plurality of transport providers. The processor may be further configured to transmit the plurality of input packets to a plurality of application program instances that are respectively associated with the plurality of queues. The processor may be further configured to instantiate a respective plurality of concurrent multipoint conferencing sessions between the respective sender computing devices and a corresponding plurality of recipient computing devices. The processor may be further configured to transmit a plurality of output packets from the plurality of application program instances to the plurality of recipient computing devices during the concurrent multipoint conferencing sessions. The plurality of output packets of the plurality of concurrent multipoint conferencing sessions may be multiplexed through the port and may each have a multiplexed local socket address of the port.

According to this aspect, each queue may have a respective queue identifier.

According to this aspect, the input packet data of each input packet may further include a source Internet Protocol (IP) address of a sender computing device of the plurality of sender computing devices from which the input packet is received.

According to this aspect, a first dispatch data structure of the one or more dispatch data structures may map the respective source IP addresses of the plurality of input packets to the plurality of queue identifiers.

According to this aspect, the processor may be further configured to add a new source IP address to the first dispatch data structure after receiving a binding request including the new source IP address.

According to this aspect, a second dispatch data structure of the one or more dispatch data structures may map a respective plurality of usernames of a plurality of binding requests included in the plurality of input packets to the plurality of queue identifiers.

According to this aspect, the processor may be further configured to receive a binding response. The processor may be further configured to determine that a source IP address of a sender computing device from which the binding response is received or the queue identifier of the queue associated with the transport provider at which the binding response is received is not included in the second dispatch data structure. In response to the determination, the processor may be further configured to discard the binding response.

According to this aspect, the input packet data of each input packet may include a respective endpoint identifier and a respective source Internet Protocol (IP) address of the input packet. A third dispatch data structure of the one or more dispatch data structures may map the respective endpoint identifiers of the plurality of input packets to the plurality of queue identifiers.

According to this aspect, each concurrent multipoint conferencing session of the plurality of concurrent multipoint conferencing sessions may be an audioconferencing session or a videoconferencing session.

According to this aspect, a plurality of copies of at least one input packet may be received via a respective plurality of communication channels from a sender computing device of the plurality of sender computing devices.

According to another aspect of the present disclosure, a method for use with a conferencing computing device is provided. The method may include storing one or more dispatch data structures in memory. The method may further include receiving a plurality of input packets at a port from a plurality of sender computing devices. Each input packet may have respective input packet data. Based on the input packet data and the one or more dispatch data structures, for each input packet of the plurality of input packets, the method may further include adding that input packet to a queue of a transport provider bound to the port. The transport provider may be one of a plurality of transport providers bound to the port. The queue may be one of a plurality of queues, each of the plurality of queues being respectively included in a corresponding one of the plurality of transport providers. The method may further include transmitting the plurality of input packets to a plurality of application program instances that are respectively associated with the plurality of queues. The method may further include instantiating a respective plurality of concurrent multipoint conferencing sessions between the respective sender computing devices and a corresponding plurality of recipient computing devices. The method may further include transmitting a plurality of output packets from the plurality of application program instances to the plurality of recipient computing devices during the concurrent multipoint conferencing sessions. The plurality of output packets of the plurality of concurrent multipoint conferencing sessions may be multiplexed through the port and may each have a multiplexed local socket address of the port.

According to this aspect, each queue may have a respective queue identifier.

According to this aspect, the input packet data of each input packet may further include a source Internet Protocol (IP) address of a sender computing device of the plurality of sender computing devices from which the input packet is received.

According to this aspect, a first dispatch data structure of the one or more dispatch data structures may map the respective source IP addresses of the plurality of input packets to the plurality of queue identifiers.

According to this aspect, the method may further include adding a new source IP address to the first dispatch data structure after receiving a binding request including the new source IP address.

According to this aspect, a second dispatch data structure of the one or more dispatch data structures may map a respective plurality of usernames of a plurality of binding requests included in the plurality of input packets to the plurality of queue identifiers.

According to this aspect, the method may further include receiving a binding response. The method may further include determining that a source IP address of a sender computing device from which the binding response is received or the queue identifier of the queue associated with the transport provider at which the binding response is received is not included in the second dispatch data structure. In response to the determination, the method may further include discarding the binding response.

According to this aspect, the input packet data of each input packet may include a respective endpoint identifier and a respective source Internet Protocol (IP) address of the input packet. A third dispatch data structure of the one or more dispatch data structures may map the respective endpoint identifiers of the plurality of input packets to the plurality of queue identifiers.

According to another aspect of the present disclosure, a conferencing computing device is provided, including memory storing one or more dispatch data structures. The conferencing computing device may further include a processor configured to, at a port, receive a first plurality of input packets from one or more first sender computing devices and a second plurality of input packets from one or more second sender computing devices. Each input packet may have respective input packet data. Based on the respective input packet data of each input packet and the one or more dispatch data structures, the processor may be further configured to add each input packet of the first plurality of input packets to a first queue included in a first transport provider bound to the port and add each input packet of the second plurality of input packets to a second queue included in a second transport provider bound to the port. The processor may be further configured to transmit the first plurality of input packets to a first application program instance respectively associated with the first queue and transmit the second plurality of input packets to a second application program instance respectively associated with the second queue. The processor may be further configured to instantiate a first multipoint conferencing session between the one or more first sender computing devices and one or more first recipient computing devices and instantiate a second multipoint conferencing session between the one or more second sender computing devices and one or more second recipient computing devices. The processor may be further configured to transmit a first plurality of output packets from the first application program instance to the one or more first recipient computing devices and transmit a second plurality of output packets from the second application program instance to the one or more second recipient computing devices. The first plurality of output packets and the second plurality of output packets may each have a multiplexed local socket address of the port.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A conferencing computing device comprising:
memory storing one or more dispatch data structures; and
a processor configured to:
receive a plurality of input packets at a shared port from a plurality of sender computing devices, each input packet having respective input packet data;
based on the input packet data and the one or more dispatch data structures, for each input packet of the plurality of input packets, add that input packet to an input queue bound to the shared port;
transmit the plurality of input packets to a plurality of application program instances that are respectively associated with the plurality of input queues, wherein the plurality of application program instances are executed concurrently;
generate a plurality of output packets at the plurality of application program instances;
for each output packet of the plurality of output packets, add that output packet to an output queue associated with the application program instance at which that output packet was generated; and
through the shared port, transmit the plurality of output packets from the respective output queues of the plurality of application program instances to a plurality of recipient computing devices.

2. The conferencing computing device of claim 1, wherein the input packet data of each input packet further includes a source Internet Protocol (IP) address of a sender computing device of the plurality of sender computing devices from which the input packet is received.

3. The conferencing computing device of claim 2, wherein a first dispatch data structure of the one or more dispatch data structures maps the respective source IP addresses of the plurality of input packets to the plurality of input queues.

4. The conferencing computing device of claim 3, wherein the processor is further configured to:
receive a binding request including a new source IP address; and
add the new source IP address to the first dispatch data structure in response to receiving the binding request.

5. The conferencing computing device of claim 1, wherein a second dispatch data structure of the one or more dispatch data structures maps a respective plurality of usernames of a plurality of binding requests included in the plurality of input packets to a respective plurality of queue identifiers of the plurality of input queues.

6. The conferencing computing device of claim 5, wherein the processor is further configured to:
receive a binding response;
determine that a source IP address of a sender computing device from which the binding response is received is not included in the second dispatch data structure; and
in response to the determination, discard the binding response.

7. The conferencing computing device of claim 1, wherein:
the input packet data of each input packet includes a respective endpoint identifier and a respective source Internet Protocol (IP) address of the input packet; and
a third dispatch data structure of the one or more dispatch data structures maps the respective endpoint identifiers of the plurality of input packets to a respective plurality of queue identifiers of the plurality of input queues.

8. The conferencing computing device of claim 1, wherein a plurality of copies of at least one input packet are received via a respective plurality of communication channels from a sender computing device of the plurality of sender computing devices.

9. The conferencing computing device of claim 1, wherein each application program instance is an instance of an audioconferencing or videoconferencing application program.

10. The conferencing computing device of claim 1, wherein the plurality of output packets each have a multiplexed local socket address of the shared port.

11. The conferencing computing device of claim 10, wherein the multiplexed local socket address of the shared port includes a multiplexed local Internet Protocol (IP) address and a multiplexed port identifier.

12. A method for use with a conferencing computing device, the method comprising:
storing one or more dispatch data structures in memory;
receiving a plurality of input packets at a shared port from a plurality of sender computing devices, each input packet having respective input packet data;
based on the input packet data and the one or more dispatch data structures, for each input packet of the plurality of input packets, adding that input packet to an input queue bound to the shared port;
transmitting the plurality of input packets to a plurality of application program instances that are respectively associated with the plurality of input queues, wherein the plurality of application program instances are executed concurrently;
generating a plurality of output packets at the plurality of application program instances;
for each output packet of the plurality of output packets, adding that output packet to an output queue associated with the application program instance at which that output packet was generated; and
through the shared port, transmitting the plurality of output packets from the respective output queues of the plurality of application program instances to a plurality of recipient computing devices.

13. The method of claim 12, wherein the input packet data of each input packet further includes a source Internet Protocol (IP) address of a sender computing device of the plurality of sender computing devices from which the input packet is received.

14. The method of claim 13, further comprising:
receiving a binding request including a new source IP address; and
adding the new source IP address to the first dispatch data structure in response to receiving the binding request.

15. The method of claim 13, wherein a first dispatch data structure of the one or more dispatch data structures maps the respective source IP addresses of the plurality of input packets to the plurality of input queues.

16. The method of claim 12, wherein a second dispatch data structure of the one or more dispatch data structures maps a respective plurality of usernames of a plurality of binding requests included in the plurality of input packets to a respective plurality of queue identifiers of the plurality of input queues.

17. The method of claim 16, further comprising:
receiving a binding response;
determining that a source IP address of a sender computing device from which the binding response is received is not included in the second dispatch data structure; and
in response to the determination, discarding the binding response.

18. The method of claim 12, wherein:
the input packet data of each input packet includes a respective endpoint identifier and a respective source Internet Protocol (IP) address of the input packet; and
a third dispatch data structure of the one or more dispatch data structures maps the respective endpoint identifiers of the plurality of input packets to a respective plurality of queue identifiers of the plurality of input queues.

19. The method of claim 12, wherein:
the plurality of output packets each have a multiplexed local socket address of the shared port; and
the multiplexed local socket address of the shared port includes a multiplexed local Internet Protocol (IP) address and a multiplexed port identifier.

20. A conferencing computing device comprising:
memory storing one or more dispatch data structures; and
a processor configured to:
at a shared port, receive a first plurality of input packets from one or more first sender computing devices and a second plurality of input packets from one or more second sender computing devices, each input packet having respective input packet data;
based on the respective input packet data of each input packet and the one or more dispatch data structures, add each input packet of the first plurality of input packets to a first input queue bound to the shared port and add each input packet of the second plurality of input packets to a second input queue bound to the shared port;
transmit the first plurality of input packets to a first application program instance respectively associated with the first input queue;
transmit the second plurality of input packets to a second application program instance respectively associated with the second input queue, wherein the first application program instance and the second application program instance are executed concurrently;
generate a first plurality of output packets at the first application program instance;
generate a second plurality of output packets at the second application program instance;
for each output packet of the first plurality of output packets, add that output packet to a first output queue associated with the first application program instance;
for each output packet of the second plurality of output packets, add that output packet to a second output queue associated with the second application program instance; and
through the shared port, transmit the first plurality of output packets and the second plurality of output packets from the first output queue and the second output queue, respectively, to a plurality of recipient computing devices.

* * * * *